(12) United States Patent
Cabezas et al.

(10) Patent No.: US 7,085,939 B2
(45) Date of Patent: Aug. 1, 2006

(54) METHOD AND APPARATUS FOR SUPPLYING POWER TO A BUS-CONTROLLED COMPONENT OF A COMPUTER

(75) Inventors: Rafael G. Cabezas, Austin, TX (US); Daniel J. Knabenbauer, Reseda, CA (US)

(73) Assignee: International Business Machines Corporation, Armonk, NY (US)

( * ) Notice: Subject to any disclaimer, the term of this patent is extended or adjusted under 35 U.S.C. 154(b) by 932 days.

(21) Appl. No.: 09/737,455

(22) Filed: Dec. 14, 2000

(65) Prior Publication Data

US 2004/0210777 A1    Oct. 21, 2004

(51) Int. Cl.
*G06F 1/26* (2006.01)
(52) U.S. Cl. .......................... 713/300; 713/340; 710/15
(58) Field of Classification Search ................ 713/300, 713/310, 340; 710/15, 300, 301; 174/52.1; 312/223.1, 223.2; 361/600, 679–686
See application file for complete search history.

(56) References Cited

U.S. PATENT DOCUMENTS

| | | | |
|---|---|---|---|
| 5,852,544 A * | 12/1998 | Lee | 361/683 |
| 6,011,323 A * | 1/2000 | Camp | 307/64 |
| 6,253,329 B1 * | 6/2001 | Kang | 713/300 |
| 6,357,011 B1 * | 3/2002 | Gilbert | 713/300 |
| 6,564,333 B1 * | 5/2003 | Ho et al. | 713/340 |

* cited by examiner

*Primary Examiner*—Lynne H. Browne
*Assistant Examiner*—Paul Yanchus, III
(74) *Attorney, Agent, or Firm*—Mark S. Walker; Edmond A. DeFrank

(57) ABSTRACT

A method and apparatus for handling power consumption of a bus-controlled component such that the power requirements of the bus-controlled component are met without drawing excessive power from the computer bus. The apparatus of the present invention includes two embodiment of a bus power handling device that enables power to be obtained directly from a power supply and from a bus slot. In a first embodiment, the bus power handling device fits between the bus slot and the bus-controlled component and enable the component to obtain power directly from a power supply and from the bus slot. In a second embodiment, the bus power handling device is located on the bus-controlled component and allows connection to the power supply and the bus slot. The method of the present invention includes a technique to draw additional power required for the bus-controlled component directly from a power supply. In particular, the method of the present invention includes redirecting power leads of a bus-controlled component from the bus connection to a bus power-handling device and connecting the bus power-handling device to a power supply. In addition, the method includes ensuring that the bus-controlled component does not draw power from the bus connection than allowed by the computer bus specification.

14 Claims, 6 Drawing Sheets

METHOD AND APPARATUS FOR SUPPLYING POWER TO A BUS-CONTROLLED COMPONENT OF A COMPUTER

BACKGROUND OF THE INVENTION

1. Field of the Invention

The present invention relates in general to computer buses and more particularly to a method and apparatus for handling power consumption of a bus-controlled component such that the power requirements of the bus-controlled component are met without drawing excessive power from the computer bus.

2. Related Art

Computer buses are an integral and vital part of a computer system that provide a path by which data travels within the computer system. Typically, the computer bus is a collection of wires that connects one part of the computer with another. For example, an internal bus connects internal computer components to a central processing unit (CPU) and main memory, while an expansion bus connects bus-controlled components (such as expansion boards or adapters) to the CPU and main memory. A computer bus includes a data bus, which transfers the data, and an address bus, which transfers information regarding where the data should go. The expansion bus includes a bus connection (such as a bus slot) into which the bus-controlled component is inserted to add capability to the computer. In general, the bus-controlled component is a printed circuit board such as, for example, a video adapter, graphics accelerator, sound card, accelerator board and an internal modem.

One popular type of computer bus is the local bus architecture. Local bus architecture includes both the Industry Standard Architecture (ISA) expansion bus and the Peripheral Component Interconnect (PCI) local bus. In general, the PCI local bus is a newer architecture than the ISA architecture and provides fast throughput that allows data to be exchanged rapidly by connecting directly or nearly directly to the CPU. In addition, the Accelerated Graphics Port (AGP) architecture is closely related to the PCI architecture and used for video bus-controlled components. Each type of local bus architecture is governed by a set of rules or standards that specify operational parameters. These standards include a rule dictating the maximum amount of power that a bus-controlled component should draw from a bus connection or slot. For example, the PCI standards call for a maximum of 25 watts of power to be drawn from a PCI bus slot in a computer. The reason for these power standards is that the additional draw of power through any individual bus connection or slot may cause unwanted induction or other artifacts that will degrade the signals of the bus-controlled component and substantially decrease the reliability of the entire computer bus.

One problem, however, is that bus-controlled components, such as those using the PCI or AGP bus standard, are becoming increasingly complex and are often expected to drive other power-consuming devices. In order to drive these other devices, bus-controlled components typically must draw 100 watts or more of power from the bus connection (or slot) into which they are inserted. There are currently two techniques used to deal with the additional power requirements. First, the bus-controlled component is designed to draw power from more that one bus slot even though it is inserted into a single bus slot. Depending on the power required, the bus-component could be drawing power from its own bus slot as well as several adjacent bus slots. This technique effectively disables adjacent bus slots and can severely limit the number of bus-components that may be used in a computer. In addition, the reliability and longevity of the bus-controlled components are degraded.

Another technique used to deal with additional power requirements is to simply ignore the computer bus standards and draw all the required power from a single bus slot into which the bus-controlled component is inserted. The problem with this technique, however, is that the reliability and performance of the entire computer bus is adversely affected. Moreover, this technique merely avoids the problem by allowing the problem to reintroduce itself as power demands for future bus-controlled components increase. The use of either technique involves the risk of damaging the computer bus or other computer system components that are not designed to handle the increased power load.

Accordingly, what is needed is a method and apparatus for enhanced handling of the additional power consumption requirements of a bus-controlled component that does not use either of the above-mentioned techniques and solves the power consumption problem. In particular, what is needed is a method and apparatus for power consumption handling of a bus-controlled component that does not draw power from adjacent bus slots. Moreover, what is needed is a method and apparatus that adhere to the standards for the computer bus and do not draw a greater amount of power from the bus slot than allowed by the bus standard, thereby increasing the reliability and longevity of the computer bus and components.

SUMMARY OF THE INVENTION

To overcome the limitations in the prior art as described above and other limitations that will become apparent upon reading and understanding the present specification, the present invention includes a method and apparatus for enhanced handling of the power consumption of a device on a computer system (such as a bus-controlled component). The present invention supplies power to the device from an integrated power supply (such as a bus slot) up to a threshold allowed by a computer bus standard and then supplies power directly from a non-integrated power supply (power supply) without modifying or violating any of the existing computer bus standards. Thus, no power is drawn from adjacent bus connections (or slots), no adjacent bus slots are disabled, and the reliability, longevity and integrity of the computer bus and the bus-controlled components are not compromised.

The method of the present invention includes a technique to draw additional power required for the bus-controlled component directly from a power supply. In particular, the method of the present invention includes redirecting power leads of a bus-controlled component from the bus connection to a bus power-handling device and connecting the bus power-handling device to a power supply. In addition, the method includes ensuring that the bus-controlled component does not draw more power from the bus slot than allowed by the computer bus specification. The present invention includes a bus power handling device having two embodiments. More specifically, a first embodiment of the bus power handling device enables an unmodified bus-controlled component to draw additional power directly from a power supply. In this first embodiment, the bus power handling device inserts into the bus slot between the bus-controlled component and the bus slot. In a second embodiment, the bus power handling device is located on a modified bus-controlled component to allow connection to the power supply. In this embodiment, the bus power handling device is included in the design of the bus-controlled component Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Bus-controlled components (such as, for example, video adapters, graphics accelerators, sound cards and internal modems) are useful devices that expand the capability of a computer system. As these bus-controlled components become more sophisticated and complex they tend to use ever-increasing amounts of power. This places a heavy burden on the bus slot into which these bus-controlled components are inserted. For example, many bus-controlled components require much more power than current computer bus standards allow to be delivered through a single bus slot. This means that manufacturers of bus-controlled components must either introduce a new computer architecture and standard (a costly task) or must obtain power from more than one bus slot to power the bus-controlled components.

The present invention solves these problems and enables a bus-controlled component requiring more power than allowed by the computer bus standard to be used safely in computer systems. The method and apparatus of the present invention ensures that no more than the maximum amount of power allowed by the computer bus standard is obtained from the bus slot. In addition, the present invention alleviates possible damage to system components, works with widespread and popular computer bus architectures (such as PCI and AGP), and allows new bus-controlled components to be designed to use the bus power handling device of the present invention. Using the present invention, bus-controlled components receive the power necessary to operate while maintaining component reliability and longevity, minimizing risk of damage to the computer system, and adhering to computer bus standards.

II. Exemplary Operating Environment

The following discussion is designed to provide a brief, general description of a suitable environment in which the present invention may be implemented. It should be noted that FIGS. 1A and 1B depict only one of several ways in which the present invention may be implemented.

Figure 1A:
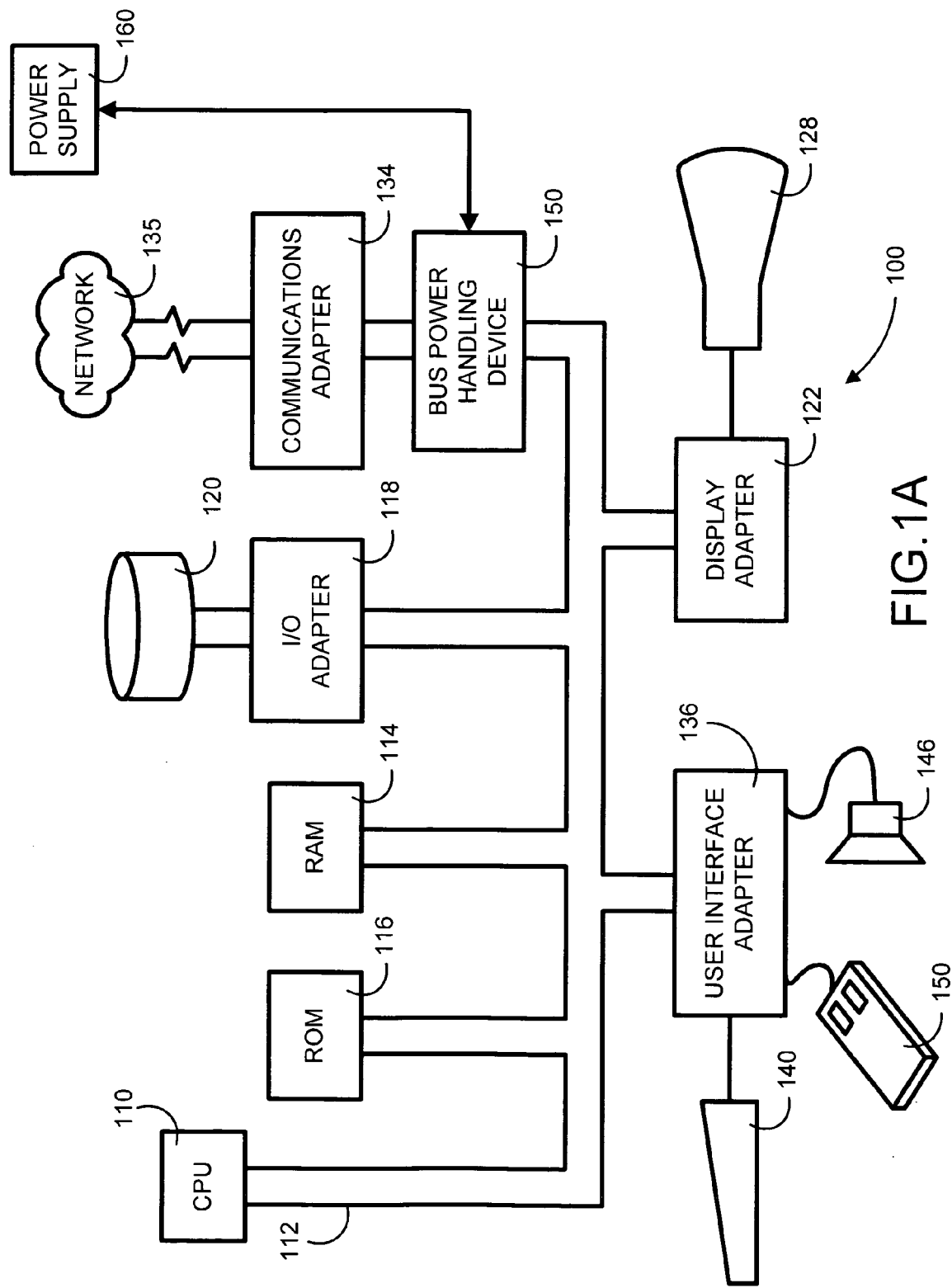
FIG. 1A is a block diagram of a computer system incorporating the first embodiment of the present invention and is shown for illustrative purposes only.
Figure 1B:
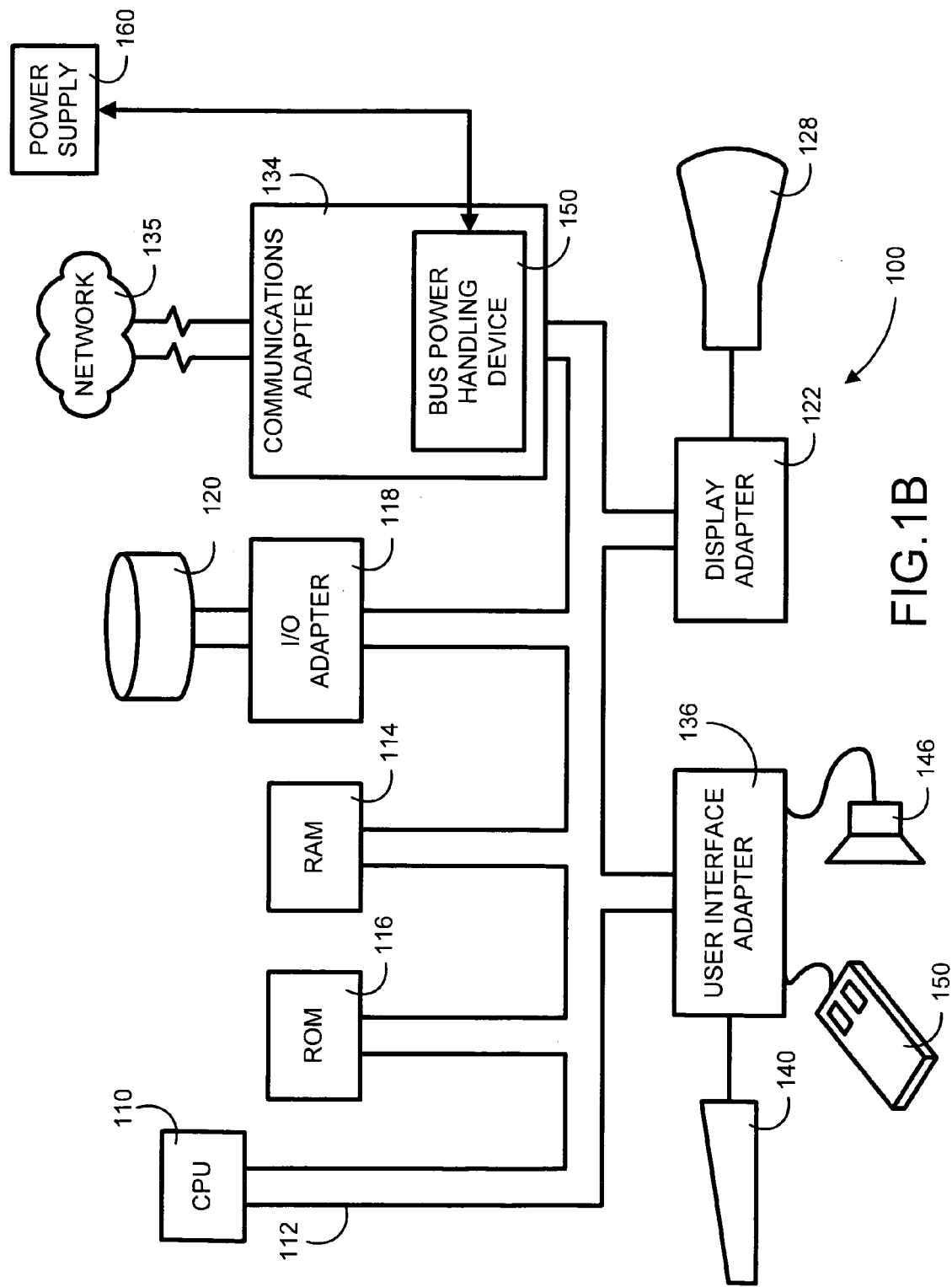
FIG. 1B is a block diagram of a computer system incorporating the second embodiment of the present invention and is shown for illustrative purposes only.

FIG. 1A is a block diagram of a computer system incorporating the first embodiment of the present invention and is shown for illustrative purposes only. In particular, a computer system 100 includes any suitable central processing unit (CPU) 110, such as a standard microprocessor, and any number of other objects interconnected by a computer bus 112. It should be noted that the computer system 100 may also include a plurality of CPUs 110, such as may be used in a mainframe computer. For purposes of illustration, the computer system 100 includes memory such as random-access memory (RAM) 114, read-only memory (ROM) 116, and storage devices (such as hard disk or disk drives 120) connected to the computer bus 112 by an input/output (I/O) adapter 118. The computer system 100 further includes a display adapter 122 for connecting the computer bus 112 to a suitable display device 128. A communications adapter 134 connects the computer bus 112 with a network 135. In addition, a user interface adapter 136 is capable of connecting the computer bus 112 to other user interface devices, such as a keyboard 140, a speaker 146, a mouse 150 and a touchpad (not shown).

Preferably, a graphical user interface (GUI) and an operating system (OS) reside within a computer-readable media and contain device drivers that allow one or more users to manipulate object icons and text on the display device 128. Any suitable computer-readable media may retain the GUI and OS, such as, for example, the RAM 114, ROM 116, hard disk or disk drives 120 (such as magnetic diskette, magnetic tape, CD-ROM, optical disk or other suitable storage media).

In this first embodiment, a bus power handling device 150 is located on the computer bus 112 and a bus-controlled component (such as the communications adapter 134). As discussed in detail below, in this first embodiment the bus power consumption device 150 provides a connection point for an input from a power supply 160, thus enabling the communication adapter 134 to obtain power from both the power supply 160 and slot on the computer bus 112.

FIG. 1B is a block diagram of a computer system incorporating the second embodiment of the present invention and is shown for illustrative purposes only. In this second embodiment, the bus power handling device 150 is located on a bus-controlled component (such as the communications adapter 134) and provides for the connection of the communications adapter 134 to the power supply 160. As explained in detail below, in this second embodiment the communications adapter 134 and bus power handling device 150 are connected to a slot of the computer bus 112 but do not draw any additional power from the slot other than that allowed by a computer bus specification.

III. Components and Operation of the Invention

Figure 2A:
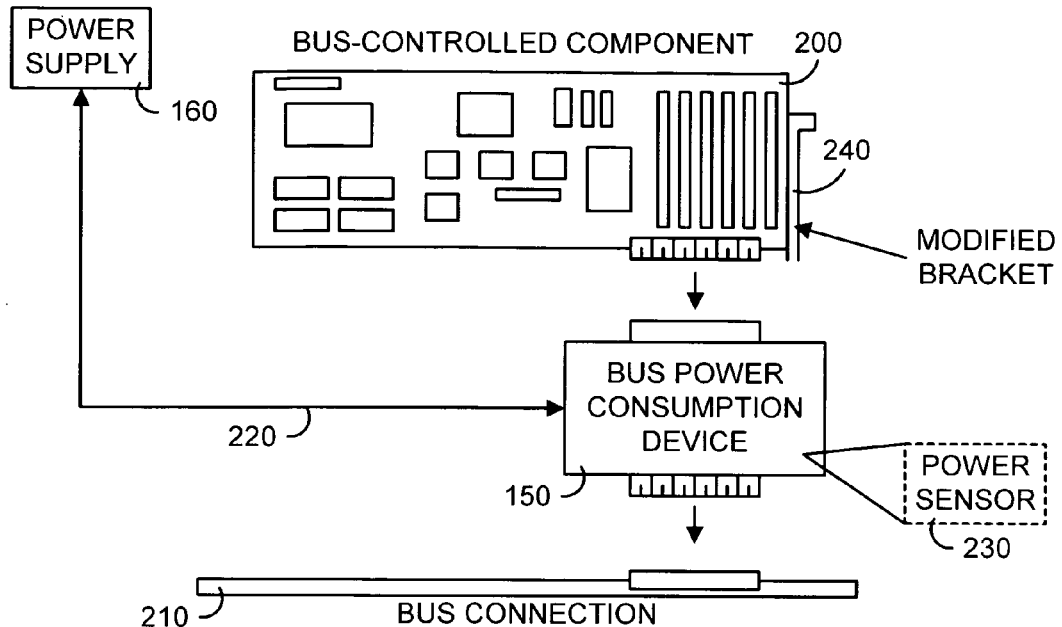
FIG. 2A illustrates in greater detail the bus power handling device of FIG. 1A of the present invention.
Figure 2B:
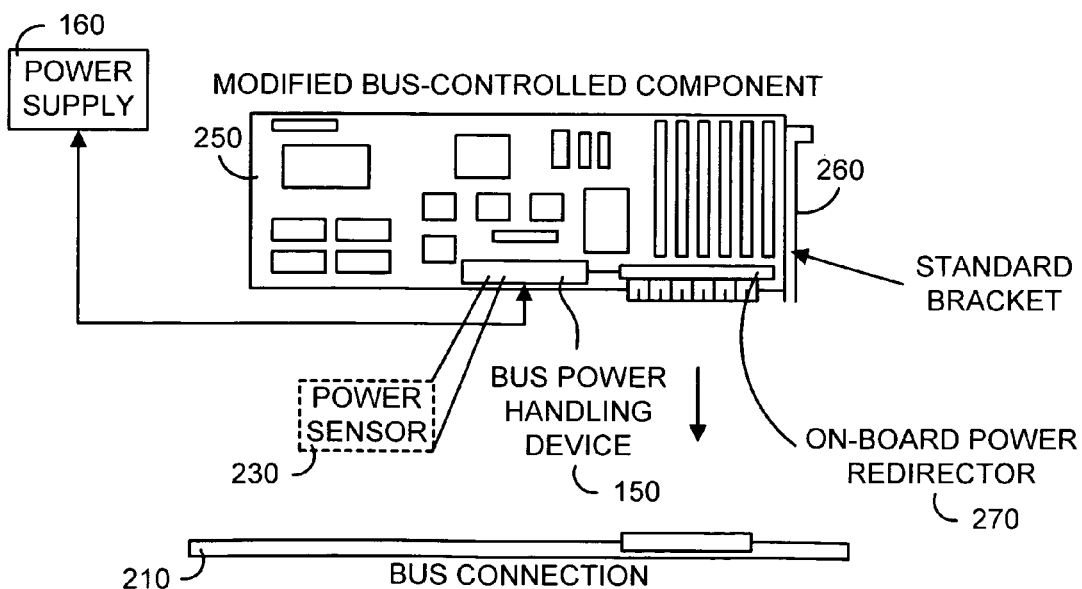
FIG. 2B illustrates in greater detail the bus power handling device of FIG. 1B of the present invention.

The bus power handling device of the present invention allows power required for a bus-controlled component to be drawn directly from a power supply as well as a bus slot. The present invention includes two embodiments, as shown in FIGS. 2A and 2B. The first embodiment is shown in FIG. 2A and enables an unmodified bus-controlled component to draw power directly from a power supply and a bus slot. The second embodiment is shown in FIG. 2B and the bus power handling device is located on a modified bus-controlled component and allows connection to both the power supply and bus slot. The details of the two embodiments will now be discussed.

FIG. 2A illustrates in greater detail the first embodiment of the bus power handling device shown FIG. 1A. One advantage of this first embodiment of the bus power handling device 150 is that it allows an unmodified bus-controlled component 200 to have the benefits of obtaining power from the power supply 160 without the need for modification or redesign. In general, this first embodiment of the bus power handling device 150 is located between a bus connection (or slot) 210 and the bus-controlled component 200. Thus, the bus power handling device 150 is inserted into the bus connection 210 and the bus-controlled component 200 is inserted into the bus power handling device 150. The bus power handling device 150 provides a connection point for the power supply 160 such that a power supply lead 220 may be connected to the bus power handling device 150 so as to supply power to the bus-controlled component 200. An optional power sensor 230 may be located on the bus power handling device 150 (shown as optional in FIG. 2A by the dashed lines). As discussed in further below, the power sensor 230 is used in some embodiments of the present invention to manage the power required for the bus-controlled component 200.

Because this first embodiment of the bus power handling device 150 is located between the bus connection 210 and the bus-controlled component 200, a bracket securing the bus-controlled component 200 within the bus connection 210 must be modified. The modified bracket 240 accounts for the slight offset of the bus-controlled component 200 due to the bus power handling device 150 and allows the bus-controlled component 200 to be secured to, for example, a computer case (not shown). The modified bracket 240 ensures that all external connections to the bus-controlled component 200 remain accessible and ensures that the bus-controlled component 200 can be secured while allowing a cover of the computer to be properly closed.

FIG. 2B illustrates in greater detail the second embodiment of the bus power handling device of FIG. 1B. Similar to the first embodiment, the second embodiment of the bus power handling device 150 allows the bus-controlled component 200 to be connected directly to the power supply 160. The main difference and advantage is that bus power handling device 150 does not have to be inserted between a bus-controlled component and the bus connection 210. In this second embodiment, all necessary circuitry for connection to the power supply 160 is built directly on to a modified bus-controlled component 250. This modified bus-controlled component 250 is designed with the bus power handling device 150 on the component 250. In this embodiment, the bus power handling device 150 may be used as a type of power supply for the modified bus-controlled component 250 by having its outputs not only powering the component's circuitry but also other power-consuming devices such as cooling fans. This embodiment may be used when space is at a premium in the computer case or when it is known during the design phase of the bus-controlled component that additional power consumption will be required above what the computer bus standard will allow.

As shown in FIG. 2B, the modified bus-controlled component 250 includes the bus power handling device 150 that is designed and built-in to the component 250. The modified bus-controlled component 250 inserts into the bus connection 210 without any type of adapter. An optional power sensor 230 (shown as optional in FIG. 2B by the dashed lines) is located on the bus power handling device 150. As discussed in detail below, the optional power sensor 230 is used in some embodiments of the present invention to manage power draw from both the bus connection 210 and the power supply 160.

A standard bracket 260 is used to secure the modified bus-controlled component 250, and no modification of the bracket 260 is necessary because there is no offsetting adapter used. Instead, the power supply lead 210 connects directly to the bus power handling device 150 to provide power from the power supply 160 directly to the modified bus-controlled component 250. An on-board power redirector 270 is used in this second embodiment to redirect power connections from the bus connection 210 to the bus power handling device 150.

Figure 3:
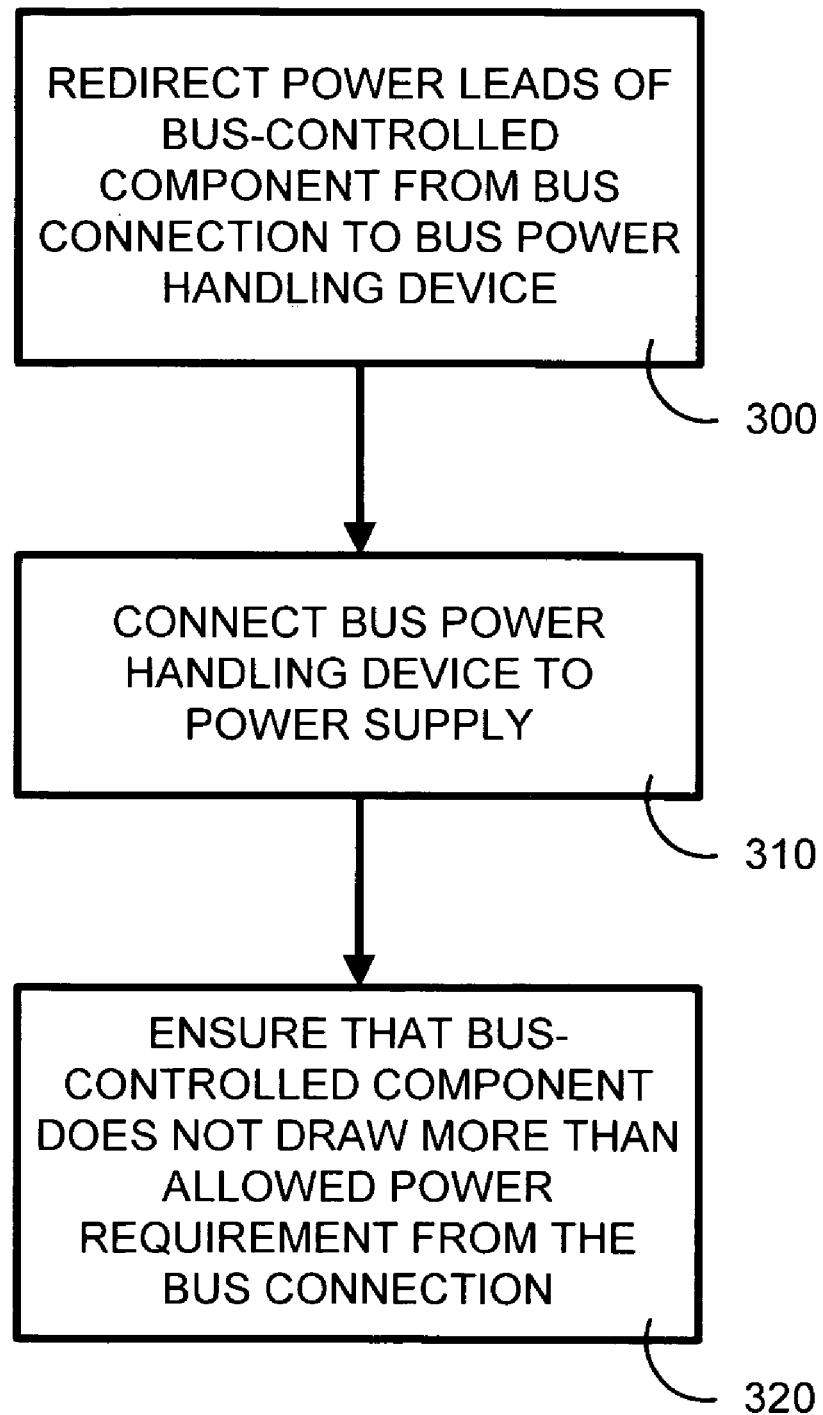
FIG. 3 is a flow diagram illustrating the general operation of the present invention.

In general, the method of the present invention allows a bus-controlled component to receive power directly from a power supply and a bus connection (or slot) into which the bus-controlled component is inserted. FIG. 3 is a flow diagram illustrating the general operation of the present invention. Initially, the method of the present invention redirects power leads of a bus-controlled component from a bus slot to a bus power handling device (box 300). Next, the bus power handling device is connected to a power supply (box 310). This allows the bus-controlled component to draw power directly from the power supply and from the bus slot. The method of the present invention guarantees that the bus-controlled component does not draw more power from the bus slot than allowed by the computer bus standard (box 320).

The present invention allows a bus-controlled component to draw power from a bus slot into which the bus-controlled component is connected and from a power supply. The present invention includes at least three techniques for achieving this power management. A first technique of the present invention has all low-power devices of the bus-controlled component (such as signal generators) draw power from the bus slot. Because these are low power devices there is no chance that the power drawn from the bus slot will exceed the maximum allowed by the computer bus standard. At the same time, high-power devices on the bus-controlled component are wired to draw power directly from the power supply.

A second technique uses the power sensor shown in FIGS. 2A and 2B. The power sensor allows all the power for the bus-controlled component to be drawn from the bus slot until the maximum allowed power is reached. After this maximum is reached, the power sensor redirects so that all power comes from the power supply. In a preferred third technique, the power sensor allow all the power to be obtained from the bus slot until the maximum allowed power is reached. At this time, the power sensor obtains all excess power required directly from the power supply. This enables the bus-controlled component to obtain power from the bus slot (up to the maximum power allowed) and any power required in excess of the maximum power allowed directly from the power supply.

IV. Component Details and Working Example

Figure 4A:
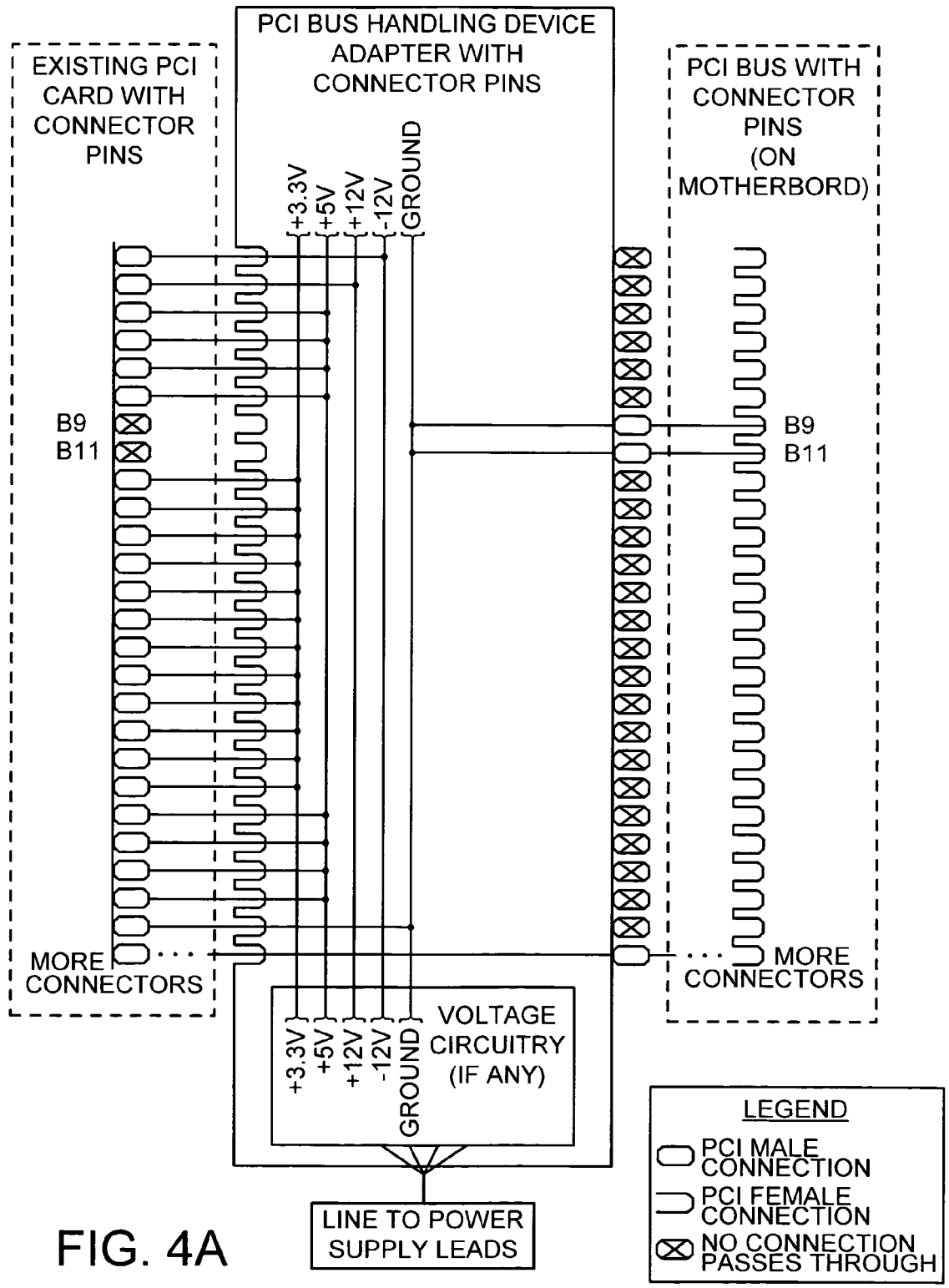
FIG. 4A is a detailed schematic of the first embodiment of the bus power handling device.
Figure 4B:
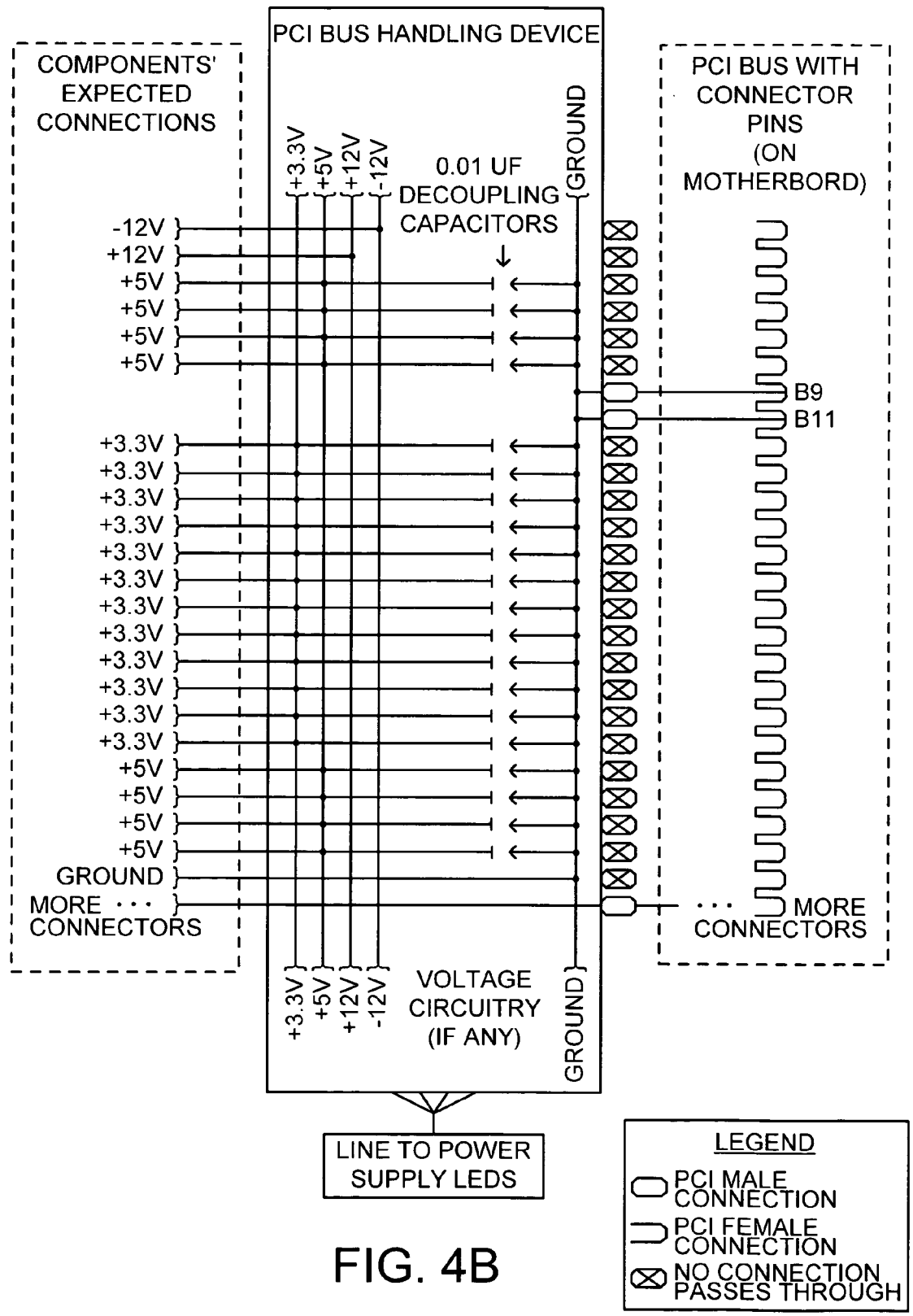
FIG. 4B is a detailed schematic of the second embodiment of the bus power handling device.

FIG. 4A is a detailed schematic of the first embodiment of the bus power handling device and FIG. 4B is a detailed schematic of the second embodiment of the bus power handling device. It should be noted that the present invention may be implemented in a variety of ways and actual implementation may vary from that shown in FIGS. 4A and 4B and in the following description. In these preferred embodiments, the PCI bus architecture is illustrated. However, it should be noted that those skilled in the art can use the illustrated schematics to extend the present invention to encompass all modular, bus-controlled components. For example, because the AGP architecture uses the PCI bus for its power, the AGP architecture has the same power consumption requirement problems as the PCI architecture. Thus, the concept and feasibility of an AGP bus power consumption device and an AGP on-board power distribution device could be derived from the detailed schematics illustrated in FIGS. 4A and 4B.

As shown in FIG. 4A, the first embodiment of the bus power handling device redirects the PCI bus-controlled component's main 12 volt, 5 volt and 3.3 volt leads away from the PCI bus connection to corresponding power supply input through circuitry in the bus power handling device. If necessary, raw power supply voltage can be adjusted with additional circuitry on the bus power handling device. In general, however, connectors (such as Molex connectors) that connect a power supply to the computer motherboard can be tapped into so as to supply the necessary voltages without modification. Because the PCI bus-controlled component draws any extra power needed to meet its requirements from the power supply, the PCI components is granted the additional current necessary to allow higher wattage consumption. At the same time, the bus power handling device grounds Pin B9 and Pin B11 on the PCI bus connection to indicate that no more than 7.5 watts will be drawn from the bus, thereby adhering to PCI bus standards. Ground pins on the PCI bus-controlled component are also redirected away from the PCI bus connection to ground lines within the bus power handling device to reduce noise on the PCI bus connection. Moreover, other pin connections on the PCI bus-controlled component or keyway spaces pass through the bus power handling device to the PCT bus connections as normal. Decoupling of voltage inputs from voltage sources is still handled on the existing PCI bus-controlled component according to PCI bus standards.

As shown in FIG. 4B, the 12 volt, 5 volt and 3.3 volts leads are redirected away from the PCI bus connection and toward the second embodiment of the bus power handling device. Preferably, the bus power handling device contains all the conversion circuitry needed (if any) from raw power supply input, as well as the capacitors to ground required for decoupling from voltage supply lines. Outputs of the bus power handling device are connected to the corresponding voltage inputs on the PCI bus-controlled component while bus Pin B9 and Pin B11 are grounded near their point of origin on the PCI component. This ensures that no more than 7.5 watts will ever be drawn from the PCI bus slot, thus complying with PCI bus standards.

If the PCI bus-controlled component requires a ground, the ground connection will routed to the bus power handling device's ground lines. All other signals will be sent through the PCI component's connection to the PCI bus slot as normal. The bus power handling device provides the additional current necessary for higher wattage consumption by providing a link to the power supply that is located on-board the PCI bus-controlled component. This ensures that the PCI bus-controlled component will not violate PCI bus standards the need for increase power to operate the component.

It should be noted that power supply connections made to both embodiments of the bus power handling device can be made in several ways. As shown in FIGS. 4A and 4B, it is assumed that the power supply leads are coming off of Molex-style connectors that can attach an ATX power supply to the computer motherboard and provide all the taps necessary to implement the designs above with minimal additional circuitry. Alternatively, the bus power handling device of the present invention may use power supply leads from the four-connection adapter typically used to power computer some computer device (such as hard disks and CD drives) by utilizing voltage dividers and other circuitry, or by other means known to those having ordinary skill in the art.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for supplying power to a bus-controlled component of a computer, comprising:
   supplying power to the bus-controlled component from an integrated power supply via a bus connection of the computer;
   determining whether the power supplied exceeds a threshold;
   if the threshold is exceeded, supplying power to the bus-controlled component from a non-integrated power supply of the computer;
   disposing a bus power handling device between a bus slot and the bus-controlled component: and
   attaching a modified bracket to the bus-controlled component for securing the bus-controlled component within a computer case.

2. The method of claim 1, wherein if the threshold is exceeded the integrated power supply supplies power up to the threshold and the non-integrated power supply supplies any excess power.

3. The method of claim 1, wherein if the threshold is exceeded the non-integrated power supply supplies all the power.

4. The method of claim 1, wherein high-power components on the bus-controlled component are supplied power from the non-integrated power supply and low-power components on the device are supplies power from the integrated power supply.

5. The method of claim 1, wherein the bus power handling device is a bus-controlled component and the integrated power supply is a bus slot capable of receiving the bus-controlled component.

6. The method of claim 1, wherein a power sensor is used to determine whether the threshold has been exceeded.

7. A bus power system of a computer for supplying power to a bus-controlled component, comprising:
- a bus slot supplying power to the bus-controlled component;
- a bus power handling device connected directly to a power supply of the computer for supplying power directly to the bus-controlled component if a bus slot power threshold is exceeded, wherein the bus power handling device is disposed between the bus slot and the bus-controlled component: and
- a modified bracket attached to the bus-controlled component for securing the bus-controlled component within a computer case.

8. The bus power system of claim 7, wherein the bus power handling device is disposed on the bus-controlled component.

9. The bus power system of claim 7, further comprising a power sensor disposed on the bus power handling device that determines whether the bus slot power threshold has been exceeded.

10. A bus power handling device of a computer, comprising:
- an input area configured to receive a bus-controlled component and an output area configured to be inserted into a bus slot that supplies power to the bus-controlled component;
- a power sensor that determines whether the bus slot has exceeded a power threshold;
- a power supply lead coupled to an external power supply that supplies power to the bus-controlled component via the bus power handling device if the power threshold is exceeded, wherein the bus power handling device is disposed between the bus slot and the bus-controlled component: and
- a modified bracket attached to the bus-controlled component for securing the bus-controlled component within a computer case.

11. The bus power handling device of claim 10, wherein the bus-controlled component obtains power from the bus slot until the power threshold is exceeded at which time the power is obtained from the power supply.

12. The bus power handling device of claim 10, wherein the bus-controlled component obtains power from the bus slot and any power in excess of the power threshold from the power supply.

13. The bus power handling device of claim 10, wherein the power threshold is a maximum power allowed by a computer bus standard for the bus slot.

14. The bus power handling device of claim 10, wherein bus slot supplies power to low-power devices on the bus-controlled component and the power supply supplies power to the high-power devices on the bus-controlled component and wherein the power supplied by the bus slot does not exceed the power threshold.

* * * * *